(12) United States Patent
Weigand et al.

(10) Patent No.: US 7,376,183 B2
(45) Date of Patent: May 20, 2008

(54) POST-PRODUCTION PROCESSING (75) Inventors: Gilbert G. Weigand, Ashburn, VA (US); Paul R. Klamer, La Canada, CA (US); Christopher J. Cookson, Studio City, CA (US)

(73) Assignee: Warner Bros. Entertainment, Inc., Burbank, CA (US)

( * ) Notice: Subject to any disclaimer, the term of this patent is extended or adjusted under 35 U.S.C. 154(b) by 422 days.

(21) Appl. No.: 10/284,461

(22) Filed: Oct. 31, 2002

(65) Prior Publication Data

US 2004/0049292 A1   Mar. 11, 2004

Related U.S. Application Data

(60) Provisional application No. 60/408,881, filed on Sep. 9, 2002.

(51) Int. Cl.
   H04N 7/12 (2006.01)
   H04N 11/02 (2006.01)
   H04N 11/04 (2006.01)
   H04B 1/66 (2006.01)

(52) U.S. Cl. ..................................... 375/240

(58) Field of Classification Search .................. 348/96, 348/722, 181, 180, 97–104
See application file for complete search history.

(56) References Cited

U.S. PATENT DOCUMENTS

| | | | |
|---|---|---|---|
| 4,872,160 A | 10/1989 | Hemmady et al. | |
| 5,014,125 A | 5/1991 | Pocock et al. | |
| 5,392,071 A * | 2/1995 | Richards et al. | 375/240.11 |
| 5,649,046 A * | 7/1997 | Stewart et al. | 386/52 |
| 5,666,215 A | 9/1997 | Fredlund et al. | |
| 5,687,011 A * | 11/1997 | Mowry | 358/527 |
| 5,778,187 A | 7/1998 | Monteiro et al. | |
| 5,799,002 A | 8/1998 | Krishnan | |
| 5,859,951 A * | 1/1999 | Aihara et al. | 386/107 |
| 5,867,502 A | 2/1999 | Chang | |
| 5,935,245 A | 8/1999 | Sherer | |
| 5,946,614 A | 8/1999 | Robbins et al. | |
| 5,973,722 A | 10/1999 | Wakai et al. | |
| 5,983,005 A | 11/1999 | Monteiro et al. | |
| 6,011,782 A | 1/2000 | DeSimone et al. | |
| 6,075,887 A * | 6/2000 | Brett | 382/167 |
| 6,097,720 A | 8/2000 | Araujo et al. | |
| 6,119,163 A | 9/2000 | Monteiro et al. | |
| 6,141,336 A | 10/2000 | Bauchot et al. | |
| 6,151,632 A | 11/2000 | Chaddha et al. | |
| 6,157,435 A | 12/2000 | Slater et al. | |

(Continued)

OTHER PUBLICATIONS

Choi et al., Design of a Flexible Open Platform for High Performance Active Networks, 1999, St. Louis, Missouri.

(Continued)

Primary Examiner—Nhon Diep
(74) Attorney, Agent, or Firm—Fish & Richardson P.C.

(57) ABSTRACT

Post-production processing may be performed by receiving a film series of one or more data units of content related to a motion picture, determining a state for the film series, determining an operation to be performed on the film series based on the state of the film series, identifying a resource that is appropriate to perform the operation to process the film series, and interfacing with the resource to enable the operation to be performed by the resource on the film series.

57 Claims, 4 Drawing Sheets

U.S. PATENT DOCUMENTS

| | | | |
|---|---|---|---|
| 6,157,635 A | 12/2000 | Wang et al. | |
| 6,189,039 B1 | 2/2001 | Harvey et al. | |
| 6,195,680 B1 | 2/2001 | Goldszmidt et al. | |
| 6,198,477 B1* | 3/2001 | Kurtze et al. | 715/500.1 |
| 6,223,211 B1* | 4/2001 | Hamilton et al. | 709/203 |
| 6,259,701 B1 | 7/2001 | Shur et al. | |
| 6,269,217 B1* | 7/2001 | Rodriguez | 386/46 |
| 6,363,075 B1 | 3/2002 | Huang et al. | |
| 6,363,429 B1 | 3/2002 | Ketcham | |
| 6,381,608 B1* | 4/2002 | Savoie | 707/102 |
| 6,415,312 B1 | 7/2002 | Boivie | |
| 6,434,622 B1 | 8/2002 | Monteiro et al. | |
| 6,445,874 B1* | 9/2002 | Catlow | 386/52 |
| 6,490,285 B2 | 12/2002 | Lee et al. | |
| 6,646,754 B1 | 11/2003 | Redd et al. | |
| 6,674,923 B1 | 1/2004 | Shih et al. | |
| 6,735,776 B1* | 5/2004 | Legate | 725/25 |
| 6,771,323 B1* | 8/2004 | Dean et al. | 348/722 |
| 6,839,803 B1 | 1/2005 | Loh et al. | |
| 6,956,967 B2 | 10/2005 | Gindele et al. | |
| 7,174,560 B1* | 2/2007 | Crinon | 725/60 |
| 7,197,715 B1* | 3/2007 | Valeria | 715/747 |
| 2002/0080409 A1 | 6/2002 | Keyes et al. | |
| 2003/0033220 A1 | 2/2003 | Slater et al. | |

OTHER PUBLICATIONS

Keller et al., An Active Router Architecture for Multicast Video Distribution, St. Louis, Missouri.

Lockwood et al., Reprogrammable Network Packet Processing on the Field Programmable Port Extender (FPX), 2001, St. Louis, Missouri.

Taylor et al., Dynamic Hardware Plugins (DHP): Exploiting Reconfigurable Hardware for High-Performance Programmable Routers, 2002, St. Louis, Missouri.

PCT International Search Report, Apr. 8, 2003, 6 pages.

* cited by examiner

POST-PRODUCTION PROCESSING

CROSS-REFERENCE TO RELATED APPLICATIONS

This application claims priority to U.S. Provisional Application No. 60/408,881, titled "Parallel Scanning, Processing and Realignment System" and filed on Sep. 9, 2002, which is incorporated by reference.

TECHNICAL FIELD

This document relates to film processing systems and data networking switches.

BACKGROUND

Various distinct film processing resources are used to process motion picture films. For example, the developed film may be scanned to generate digital images that may be stored upon scanning or after processing. Processing the digital images may include eliminating defects appearing in the digital images. The film may undergo additional processing to create a color map. After processing, the digital images may be output to a film printer or digital media for viewing by consumers.

SUMMARY

In one aspect, post-production processing may be performed by receiving at an intermediary system a film series of data units including content related to a motion picture, determining a state for the film series using the intermediary system, determining, using the intermediary system, an operation to be performed on the film series based on the state of the film series, identifying, using the intermediary system, a resource that is appropriate to perform the operation, and interfacing, using the intermediary system, with the resource to enable the operation to be performed by the resource on the film series. The data units may include a piece of content related to a motion picture.

Implementations may include one or more of the following features. For example, the film series interfacing with the resource may include communicating to the resource. Identifying a resource may include determining an amount of processing that is required by a resource performing the operation, and/or an amount of storage that is required by a resource performing the operation. A priority may be determined for the operation relative to other operations being performed by the resource. Determining the priority may include determining that the operation to be performed on the film series takes priority over an operation already designated for processing by the resource with respect to another film series.

Interfacing with the resource may include configuring the resource to perform the operation on the film series. The film series may be received from a film scanner and/or a digital camera.

The resource may include a storage device with categories for two or more different versions of the film series in different stages of processing. The different stages of processing may include a partially processed version of a film series.

The resource may include one or more processors. The processors may include a reconfigurable processor enabled to change a type of post-production processing performed. The processors may include a scalable pool of processors enabling a processor controller to control a time required for processing by specifying a number of processors to perform the operation. The operation performed on the processor may include format conversion and correction to convert the film series to a second format from a first format and to correct for errors introduced as the film series is converted to a second format from a first format. The operation performed on the processor may include special effects, color correction, data compression, and/or grain and dirt cleanup. The resource may include a film printer. Interfacing may include converting a first protocol to a second protocol. Interfacing may include controlling one or more film operations on the resource. Receiving a film series may include controlling a scanning process performed by a scanning array of one or more film scanners to convert an image to a film series representing the image. Determining the state for the film series may include reading a parameter in the film series, to include parameters specified in the networking protocol information.

The intermediary system may include a switch. The switch may aggregate support for multiple resources through a single network interface. The intermediary system also may include multiple intermediary systems.

Implementations may include a system or program capable of achieving the above features, including, for instance, a post-production processing switch, a film scanner, a storage device, a processor and a network between these components. The details of particular implementations are set forth in the accompanying drawings and the description below. Other features will be apparent from the description and drawings, and from the claims.

DETAILED DESCRIPTION

In general, a post-production processing switch may integrate one or more film processing resources to enable motion picture film processing. The switch may be configured to receive a film series (e.g., a series of digital data representing a motion picture film), determine a state for the received film series (e.g., requires color correction, resolution conversion, and/or film and dirt cleanup), determine an operation to be performed on the film series based on its state, identify a resource capable of and appropriate for performing the needed operation on the film series, and interface with the resource to perform the operation on the film series.

For example, a post-production processing switch may receive a group of images generated by scanning a film reel using an array of one or more film scanners, determine the state of the images, determine that the images need to be stored in real-time storage, identify an available storage location/device (e.g., a server or a network-attached storage), and interface with the storage location/device to enable communication and storage of the images. Interfacing with the storage location/device may include having the post-production processing switch launch one or more programs or processes on the storage location/device to enable storage of the film series.

In another example, the film series may include a data set stored on a storage device of a server. The storage device may transmit the film series to the post-production processing switch for image processing (e.g., special effects or film cleanup). The post-production processing switch receives the film series and determines a state for the film series. In this case, the post-production processing switch determines that the film series needs special effects added and requires film cleanup. The post-production processing switch identifies one or more processors capable of processing the film series. For example, the processors may include an array of workstations capable of running several post-production programs. The post-production processing switch may identify a subset of workstations within the array of workstations to perform that task. The post-production processing switch interfaces with the subset of workstations to perform the specified operations. For example, the post-production processing switch may instruct each processor to run certain programs (e.g., special effects and film cleanup) on certain portions of the film series.

Although the two examples above illustrate storing and processing operations being performed respectively, on a storage device and an array of processors, other operations and resources also are possible. For example, the film series also may be received from a digital camera, a sound stage, and one or more processors, in addition to or as an alternative to the storage devices and film scanners that were described above. Similarly, the resources may include a film printer and other media writing devices, as well as other input and output devices.

Figure 1:
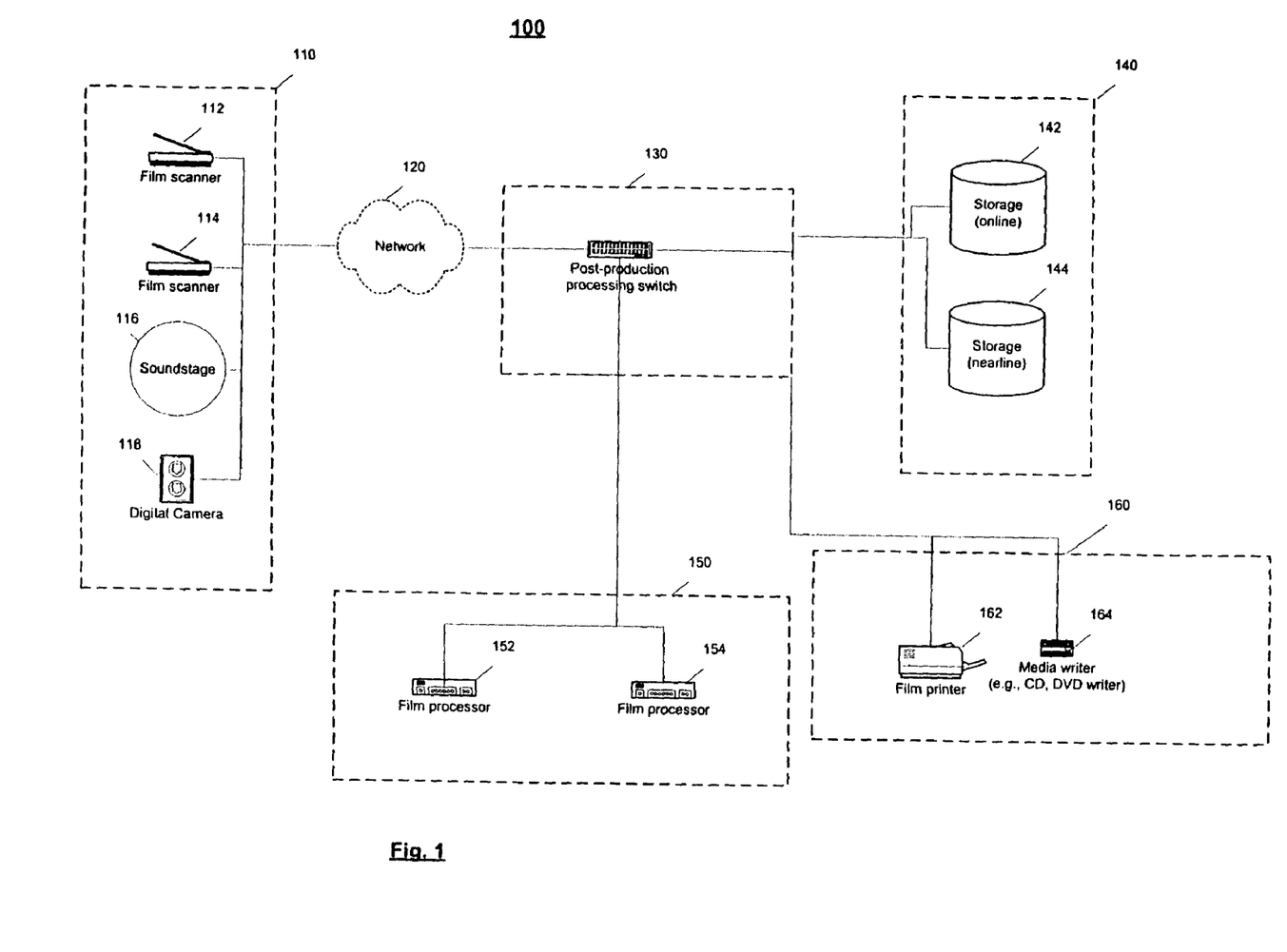
FIG. 1 is a diagram of an exemplary film processing system configured to process a film series of film data.

Referring to FIG. 1, an exemplary film processing system 100 is capable of receiving a film series in a first format and converting the film series to a second format. These formats may include different resolutions (e.g., 4k resolution or 2k resolution), different media formats (e.g., storage or film), and/or different degrees of processing (e.g., pre-special effects or with special effects).

Film processing system 100 includes an input source 110, a network 120, a post-production processing switch 130, one or more storage devices 140, one or more processors 150, and an output system 160. Although the devices shown by FIG. 1 illustrate that various devices may be included in a film processing system 100, some film processing systems 100 may be designed with greater or fewer devices, or merely a subset of the devices shown in film processing system 100 of FIG. 1. For example, a different film processing system may include only an array of one or more film scanners as input sources.

Input source 110 generally includes one or more devices configured to receive analog or unprocessed data and convert that data into a film series suitable for digital processing. In one example, the input source 110 may include a film scanner 112. In another example, the input source 110 may include an array of film scanners, for example, film scanners 112 and 114. Generally, the film scanner 112 takes a film reel and converts the frames of the reel into one or more digital images. The film scanner 112 may serially scan one frame at a time, or it may concurrently scan several frames in parallel. When several frames are scanned at a time, or when several film scanners are used, some additional processing may be required to perform film registration. For example, the film scanner 112 may send the film series to the post-production processing switch 130. The post-production processing switch 130 may send the film series from the film scanner 112 to the processor 150 to perform the preliminary processing. In another example, the film scanner 112 may include some logic to perform the initial processing.

The input source 110 may include a soundstage 116 and/or a digital camera 118. Depending on the configuration and properties of the equipment, a film series from soundstage 116 and/or digital camera 118 may require different processing than a film series from the film scanner 112. For example, registration and processing may not be required for a film series from a digital camera 118. However, where the resolution of a digital camera 118 is lower than needed (e.g., less resolution than the resolution of film scanner 112), the film series from the digital camera 118 may be processed by interpolation programs to generate a film series of a sufficiently high resolution. In another example, the film series from a digital camera 118 may require additional color correction and/or distortion processing. Similarly, the resolution of the film series may be reduced to prepare the director's daily review and/or to perform daily editing.

Network 120, when included, may include hardware and/or software capable of enabling direct or indirect communications between the input source 110 and the post-production processing switch 130. As such, the network 120 may include a direct link between the input source 110 and the post-production processing switch 130, or it may include one or more networks or subnetworks between them (not shown). Each network or subnetwork may include, for example, a wired or wireless data pathway capable of carrying and receiving data. Examples of the delivery network include the Internet, the World Wide Web, a WAN ("Wide Area Network"), a LAN ("Local Area Network"), analog or digital wired and wireless telephone networks, radio, television, cable, satellite, and/or any other delivery mechanism for carrying data. The network 120 is shown between the input source 110 and the post-production processing switch 130 to illustrate that the devices in the film processing system 100, do not need to be directly connected to the post-production processing switch 130. Rather, some or all of the devices may be connected to the post-production processing switch 130 through one or more intermediary networks, such as network 120. Likewise, some or all of the devices shown in FIG. 1 may be directly connected to the post-production processing switch 130.

Typically, the post-production processing switch 130 is configured to receive a film series, determine a state for the film series indicating an operation to be performed, identify a resource to process the film series, and interface with the resource to enable the operation to be performed on the film series. In some implementations, the post-production processing switch 130 is structured and arranged to filter and to forward between different domains at the same level of the protocol stack in the OSI ("Open System Interconnection") reference model. For example, post-production processing switch 130 may forward Ethernet frames between different Ethernet segments. In another example, post-production processing switch 130 may forward IP ("Internet Protocol") packets between different IP subnets.

Generally, the post-production processing switch 130 includes a device that performs network operations and functions in hardware (e.g., in a chip or part of chip). In some implementations, the post-production processing switch 130 may include an ASIC ("Application Specific Integrated Circuit") implementing network operations logic directly on a chip (e.g., logical gates fabricated on a silicon wafer and then manufactured into a chip). For example, an ASIC chip may perform filtering by receiving a packet, examining the IP address of the received packet, and filtering based on the IP address by implementing a logical gate structure in silicon.

Implementations of the post-production processing switch 130 may employ a Field Programmable Gate Array (FPGA) device. A FPGA device is generally defined as including a chip or chips fabricated to allow a third party designer to implement a variety of logical designs on the chip. For example, a third party designer may load a FPGA device with a design to replace the received IP addresses with different IP addresses, or may load the FPGA device with a design to segment and reassemble IP packets as the IP packets are modified while being transmitted through different networks.

Implementations of the post-production processing switch 130 also may employ a network processor. A network processor generally is defined to include a chip or chips that allow software to specify which network operations will be performed. A network processor may perform a variety of operations. One example of a network processor may include several interconnected RISC ("Reduced Instruction Set Computer") processors fabricated in a network processor chip. The network processor chip may implement software on some of the RISC processors to change an IP address of an IP packet. Other RISC processors in the network processor may implement software that monitors which terminals are receiving an IP stream.

Although various examples of network operations were defined with respect to the different devices, each of the devices may be programmable and capable of performing the operations of the other devices. For example, the FPGA device is described as the device used to replace IP addresses and segment and reassemble packets. However, a network processor and ASIC are generally capable of performing the same or similar operations.

The post-production processing switch 130 may be configured to perform protocol conversion. For example, the post-production processing switch 130 may receive from a film scanner a film series formatted according to a proprietary protocol. The post-production processing switch 130 may receive the film series, classify the film series, and convert the proprietary protocol into a standards-based protocol (e.g., TCP/IP ("Transport Control Protocol/Internet Protocol")).

The post-production processing switch 130 may be configured to process protocol parameters that are descriptive of the film series. For example, in a received film series, a specified offset may be used to communicate the state of the film series and/or the film processing parameters.

The post-production processing switch 130 may use the parameters to determine the state of the film series, identify an operation to be performed and/or identify a resource to process the film series. For example, a first parameter may be used to indicate the resolution of the image, the color map used, and/or the format of the image (e.g., JPEG ("Joint Photographic Experts Group") 2000). A second parameter may indicate whether film registration, special effects, resolution conversion, and/or film cleanup is required. A third parameter may be used to indicate the device on which to store, process or output the film series.

The protocol parameters may use common standards. For example, the film processing parameters may be mapped onto the TCP/IP protocol, such as by having the IP address indicate the IP address of a resource in the film processing system 100. The layer-three port number may indicate the processing or operation to be performed. The layer-four parameters may be used to indicate additional processing requirements, such as, for example, the desired resolution and/or required processing time.

The post-production processing switch 130 may map these parameters to a protocol to enable a resource to process the film series based on the parameters in the data unit. For example, a processor 150 may be configured to automatically perform the operations (e.g., film cleanup) indicated in the data unit (IP packet) of the film series.

The storage device 140 generally includes one or more devices to store the film series at various stages of processing. For example, the film series may be stored as the film series is being scanned. This may include, for example, a multi-terabyte data set. To reduce storage requirements, portions of the film series may be stored in different states. For example, the film series may be stored to a server from an array of film scanners. The scanning process may require some length of time to process the several reels. As the film series is being scanned, the stored film series may be sent to an array of processors to perform the film registration. Once registered, the film series may be stored over the previous unregistered images so as to eliminate storage of the same images in both registered and unregistered formats. Alternatively, the unregistered images may be moved to nearline or offline storage devices for backup.

One example of a storage device 140 is a general-purpose computer (e.g., a server) capable of responding to and executing instructions in a defined manner. Other examples include a personal computer, a special-purpose computer, a workstation, a device, a component, other equipment, or some combination thereof capable of responding to and executing instructions. The storage device 140 may include and/or form part of an information delivery network, such as, for example, a data center, the Internet, the World Wide Web, an online service provider, and/or any other analog or digital wired and/or wireless network that provides information.

The storage device 140 may receive instructions from a software application, a program, a piece of code, a device, a computer, a computer system, or a combination thereof that independently or collectively directs operations of the node. The instructions may be embodied permanently or temporarily in any type of machine, component, equipment, storage medium, or propagated signal that is capable of being delivered to the storage device 140.

In one implementation, the storage device 140 includes one or more information-providing software applications for accessing and transmitting requested files to the other devices in the film processing system 100. The information-providing applications may run on a general-purpose operating system and a hardware platform that includes a general-purpose processor and/or specialized hardware. Another implementation may include a reduced operating system with both general purpose and specialized hardware. One example of a storage device 140 as a specialized device is a network-attached-storage array.

A storage device 140 may run several applications, or a storage device 140 may be dedicated to one or more applications. One example of a storage device 140 dedicated to one application is a network-attached-storage device configured to respond to instructions from a peripheral device (e.g., film scanner 112, post-production processing switch 130, or processor 150).

The storage device 140 may include an online storage device 142, a nearline storage device 144, and/or an offline storage device (not shown). In general, an online storage device 142 stores the film series such that the film series resides on an active device (e.g., in memory or on a disk drive). A nearline storage device 144 stores the film series such that the film series undergoes some mechanical processing (e.g., by queuing a tape) prior to retrieval. For example, the nearline storage device 144 may include a tape drive, or a robotic array of optical media that loads and queues the tape drive data before accessing the storage media. Offline storage stores the film series in a mode that may require additional operator intervention for access. For example, the offline storage device may include tape storage that is then placed in a library. For the offline data series to be accessed, a technician may be required to access and load the tape drive. Aspects of the online storage device 142, the nearline storage device 144, and the offline storage device may resemble one another as the access time improves. For example, as tape drive access times improve, the properties and performance of the tape drive may approach the performance of the server. Rather than representing fixed classes of equipment, the classification of storage devices describes possibilities for storing a film series.

The processor 150 may include an array of one or more processors (e.g., processors 152 and 154) configured to perform one or more processing operations on digital images within the film series. As such, the processor 150 may include one or more devices capable of accessing a film series and performing one or more operations on the film series. The processor 150 may include a controller (not shown) that processes instructions received from or generated by a software application, a program, a piece of code, a device, a computer, a computer system, or a combination thereof, which independently or collectively directs operations of the processor 150. The instructions may be embodied permanently or temporarily in any type of machine, component, equipment, storage medium, or propagated signal that is capable of being delivered to the processor 150 or that may reside with the controller at processor 150. Processor 150 may include a general-purpose computer (e.g., a personal computer) capable of responding to and executing instructions in a defined manner, a workstation, a component, other equipment, or some combination of these items that is capable of responding to and executing instructions.

In one implementation, the processor 150 includes one or more information retrieval software applications (e.g., a file system client) capable of receiving a film series in a variety of states. The information retrieval applications may run on a general-purpose operating system and a hardware platform that includes a general-purpose processor and specialized hardware for film processing and/or other capabilities. In another example, the processor 150 may run a specialized operating system and/or operate on specialized hardware.

The processor 150 may be configured to enable the post-production processing switch 130 to select one of several programs, operations, or processes to be performed on the processor 150. Examples of the operations that may be performed by the processor 150 may include, but are not limited to, registration, color mapping, film cleanup, special effects, and/or resolution conversion.

The processor 150 may include a reconfigurable device capable of responding to film processing requirements indicated by the post-production processing switch 130. For example, the post-production processing switch 130 may manage an array of 100 processors as a pool of processing commodities. Depending on the requirements of the film series and the priority of the operations, the processors may be allocated by the switch 130 to meet the priorities and/or requirements.

For example, a high priority task may include creating the product for the director's daily review. In this example, many or all 100 processors in the array might be allocated to perform the necessary processing. In another example, an archive of older film movies might be processed and/or remastered for re-release. In this example, each of two movies might be allocated 50 processors, absent additional tasking. Upon receipt of a higher priority task, the two movies each might relinquish 30 processors to the higher priority task, with each movie continuing to be processed by 20 processors.

The output system 160 may include one or more devices configured to write the film to an output medium. In one example, the output medium may include a master film created by a film printer 162. This master film then may be used to create duplicates for distribution to cinemas. In another example, the output system 160 may include a media writer 164 (e.g., a DVD writer, a disk array for digital film distribution) designed to create digital media products for distribution.

Figure 2:
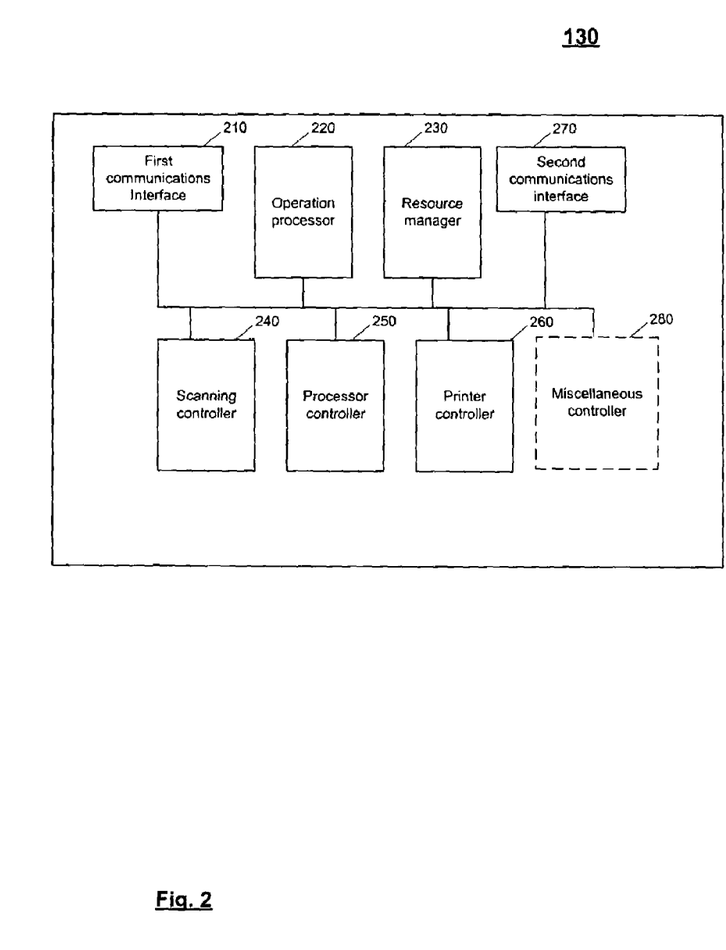
FIG. 2 is a diagram of an exemplary post-production processing switch configured to interface with one or more resources to process the film series.

Referring to FIG. 2, an exemplary post-production processing switch 130 is configured to receive a film series, determine a state for the film series identifying one or more operations to be performed, identify a resource to process the film series, and interface with the resource to enable the operation to be performed on the film series. The postproduction processing switch 130 may include a first communications interface 210 to receive a film series, an operation processor 220 to manage tasks on one or more processors, a resource manager 230 to control the allocation of available resources, a scanning controller 240 configured to interface with and control an array of one or more film scanners (e.g., scanners 112 and 114), a processor controller 250 configured to interface with and control an array of one or more processors (e.g., processor 150), a printer controller 260 configured to interface with and control one or more film printers, and a second communications interface 270 configured to enable the post-production processing switch 130 to exchange data with one or more resources (e.g., a storage device 140, a processor 150 and an output device 150).

The first communications interface 210 typically is configured to receive a film series for processing. The film series may be received from an input source 110 (e.g., film scanner 112, soundstage 116 or digital camera 118), a storage device 140, and/or processor 150. The first communications interface 210 may receive the film series directly from an input source 110, or the first communications interface 210 may receive the film series from or through one or more intervening networks (e.g., network 120) and/or the storage device 140.

The first communications interface 210 may include a standards-based interface, a proprietary interface, and/or a hybrid interface that combines aspects of a standards-based interface with some proprietary formatting. For example, the standards-based interface may include a Gigabit Ethernet interface. The proprietary interface may include one or more interfaces created by a film equipment vendor and designed to communicate film data. An example of a hybrid interface is a Gigabit Ethernet interface configured to process proprietary data formats encapsulated in Gigabit Ethernet.

The first communications interface 210 may or may not be required to use common data communications protocols, such TCP/IP. Other communications interfaces such as HIPPI ("High Performance Parallel Interface") may be used.

The operation processor 220 is a controller configured to receive a data unit, identify a state for the data unit and determine one or more operations related the state of the data unit. The operation processor 220 may classify the data unit, identify one or more parameters in the attribute portion of a data unit, and map those parameters into processing requirements. For example, the operation processor 220 may examine certain parameters in the protocols and determine that the film series needs to be stored using, for example, storage device 140. In another example, the operation processor 220 may examine the parameters and determine that a film cleanup operation needs to be performed using, for example, processor 150.

Typically, the resource manager 230 is configured to maintain the state of resources in the film processing system 100. For example, the resource manager may determine that all of the film scanners are in use, real time storage is 75% full, nearline storage is 30% full, offline storage is 2% full, and 30 of 100 processors are being used (e.g., to perform film cleanup).

The resource manager 230 may maintain the state of resources in several ways. The post-production processing switch 130 may track the state of connections and parameters through the switch, and from the state of the connections and parameters, determine which resources are being used for what purpose. Alternatively, the post-production processing switch 130 may maintain a connection to resources that is leveraged to determine the state for a particular resource. The connection may be maintained through in-band or out-of-band communications. In-band communications may include using the same channel and/or circuit that is being used to transmit the film series. Out-of-band communications may include setting up a separate connection (e.g., through an Ethernet port dedicated to management) to manage the different devices, and may be used to avoid in-band congestion.

The scanning controller 240 is an interface configured to control the film scanning process in an array of one or more film scanners. For example, the scanning controller 240 may monitor parameters in a film series received from a film scanner 112 to determine the state of the scanning process. The scanning controller 240 may transmit one or more data units to the film scanner 112 to support the scanning process. In one example, the scanning controller 240 may send acknowledgments to the film scanner 112 so that the film scanner 112 may advance to the next series of images. In another example, the scanning controller 240 may send a message so that a particular image is re-scanned.

Generally, the processor controller 250 is configured to interface with an array of one or more processors 150 to control an array of operations that may be performed on the processors 150. Interfacing with a processor may include instructing the processor to perform a designated operation on a designated data set (e.g., a portion of the film series). For example, the processor controller 250 may instruct the array of processors to perform designated special effects on a specified range of frames.

The processor controller 250 may interface with a management code segment running on one or more processors to maintain the state of the processor and to control the operation of the processor 150. For example, the processor controller 250 may select one of five programs to run on the processor. The processor controller 250 then may select one or more parameters for the selected program. Also, the processor controller 250 may select multiple programs to run simultaneously on the processor 150. In addition, the processor controller 250 may select priorities for these programs so that one program may be allocated more processing resources than a second program. Alternatively, the processor controller 250 may "swap out" the processing of a first film series running on the processor 150 and replace the processing of the first film series with the processing of a second film series.

Generally, the printer controller 260 is a controller configured to interface with one or more film printers to print the film series. Because film printing may be a monolithic process within a reel, once a printing session has begun for a reel, the film printer may be busy processing that film series for a length of time (e.g., hours or days). This may require additional planning for printing as the film reel cannot easily be changed out to accommodate a higher priority request. For example, the printer controller 260 may interface with the operation processor 220 and the resource manager 230 to determine that there are no higher priority jobs in the queue of film series to be processed before printing of a particular film series begins.

The second communications interface 270 may be configured to exchange data with one or more resources. Generally, aspects of the second communications interface 270 may be configured to relate to aspects of the first communications interface 210 described previously. However, the second communications interface 270 interfaces with the resource performing the identified operation rather than receiving the film series.

There may be one or more miscellaneous controllers 280 configured to control one or more peripheral devices, such as, for example, a soundstage 116, a digital camera 118, the storage device 140, and/or a media writer 164. Aspects of the miscellaneous controller 280 may resemble aspects of the other controllers described previously (e.g., the scanning controller 240, the processor controller 250, and/or the printer controller 260).

Figure 3:
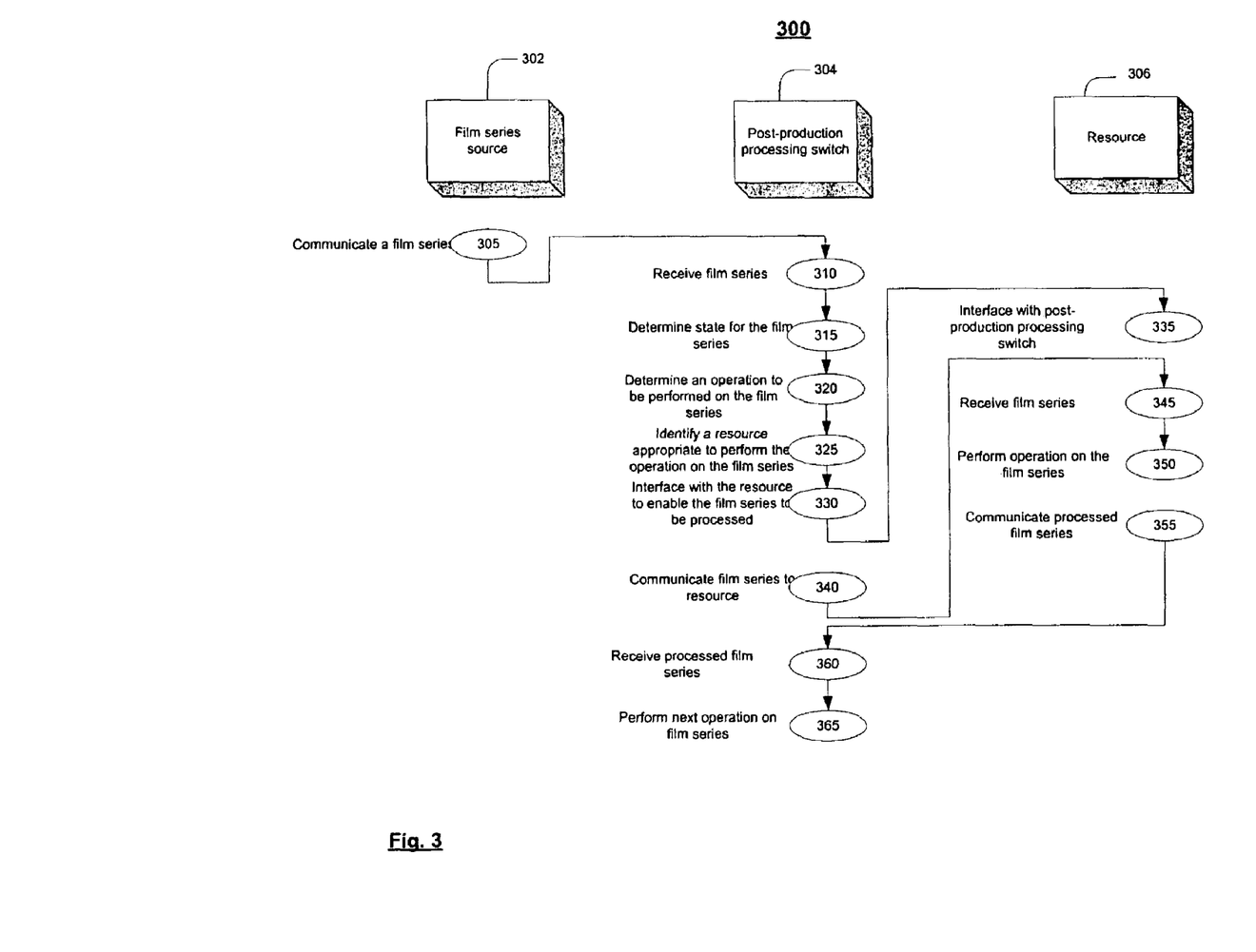
FIG. 3 is a diagram of a flow chart illustrating a process performed by the postproduction processing switch on the film series.

Referring to FIG. 3, a flow chart illustrates an exemplary process 300 for processing a film series. Specifically, FIG. 3 illustrates aspects of a process used by a film series source 302 to transmit a film series to a post-production processing switch 304. The post-production processing switch 304 interfaces with a resource 306 to perform one or more operations to process the film series. Aspects of the systems referenced in FIG. 3 may resemble aspects of the devices in the film processing system that has been described previously. For example, the film series source 302 may resemble the input source 110 (e.g., film scanners 112 and 114, soundstage 116, and digital camera 118), the storage device 140, and/or the processors 150. Similarly, the resource 306 may resemble the storage device 140, the processor 150, and/or the output system 160 (e.g., film printer 162 and media writer 164). However, FIG. 3 illustrates how the specific systems and their operations described previously may be aggregated so that their operation may be described with respect to the state of a film series being processed.

Initially, the film series source 302 communicates a film series (step 305). Communicating a film series involves accessing a film series of one or more data units and transmitting the film series to the post-production processing switch 304. Communicating a film series may include accessing an analog source (e.g., a film reel or video signal) and converting the signal to a digital representation. Although the film series may include an IP or other data network stream, the film series of data units may include framing formats typically associated with video data.

The post-production processing switch 304 receives the film series (step 310). Receiving the film series may include receiving one or more data units, removing the content from a header (e.g., IP address information), storing the content for subsequent use, and storing the header for subsequent analysis.

The post-production processing switch 304 determines a state for the film series (step 315). Typically, determining the state of the film series includes determining one or more operations to be performed on the film series (step 320). Determining a state for the film series may include analyzing the header of an IP packet encapsulating the content. For example, a film scanner 112 transmitting the film series may include frame registration information in the IP header. In another example, the header information may indicate the resolution, encoding, priority and/or processing required for the packet. Other framing formats, fields and/or portions of the content may be used to determine the state of the film series. Additionally, although the film series may include the state information as part of the series, the state of the film series may be determined from other sources. For example, the state of the film series may be received from a management station, a film scanner 112, a storage device 140, and/or a processor 150.

A resource appropriate to perform the operation on the film series is identified (step 325). For example, if film cleanup is indicated as an operation to be performed when the state of the film series is determined, the post-production processing switch 304 may identify an array or even a single processor to perform film cleanup. Examples may include using detailed state information for the film series to perform the operation, with the state information being used as parameters to ensure that identified requirements and priorities are considered. For example, if the state information indicates that a film product is required in 24 hours, the post-production processing switch 304 may allocate or manage sufficient processors so that the film product is available within 24 hours.

The post-production processing switch 304 interfaces with the resource to enable the film series to be processed (steps 330 and 335). Interfacing with the resource may include launching a code segment, job, or program that will perform one or more operations on the film series. For example, interfacing with the resource may include directing the storage device to store a film series for subsequent processing. In another example, interfacing with the resource may include determining the relative priorities of two or more operations and related film series and directing that the operation be performed on the resource to reflect that priority. In one example, reflecting the priority may include determining a state and data set for a lower priority operation and saving that state and data set to storage to enable the lower priority job to be subsequently launched from where the lower priority job was saved.

Interfacing with the resource 306 may include indicating from where a source should receive a film series. For example, the post-production processing switch 304 may transmit an identifier (e.g., pointer or directory) for the location of a subset of the film series available for retrieval. In another example, interfacing with the resource 306 may include transmitting a film series with parameters in the film series indicating the job to be performed. For example, the film series may include a series of TCP/IP packets being sent to a processor 150. The layer-four information may be used to indicate the operations to be performed on the processor 150.

The post-production processing switch 304 communicates the film series to the resource 306 (step 340), which then receives the film series (step 345). The resource 306 performs the operation on the film series (step 350). Typically, performing the operation on the film series includes performing one or more of a subset of operations available for a particular resource. For example, the storage device 140 may store the film series in real-time, nearline, or offline storage. Similarly, the processor 150 may perform film registration, color correction, film cleanup, resolution conversion, special effects, and/or other operations. The operations by the output system 160 may include a film printer 162 printing the film, and/or the digital media device 164 writing a film series to a DVD.

Depending on the resource being used and the operation being performed, the resource 306 may transmit the processed film series (step 355) to the post-production processing switch 130, which then receives the processed film series (step 360). The post-production processing switch then may perform the next operation on the film series, such as, for example, storing the films series (step 365).

Although the ways described above may appear as a sequential series of operations, the operations performed above are not necessarily performed in a serial manner or in even the sequence described above. For example, the state for a film series may be determined before the film series is received. Similarly, available resources may be identified prior to determining the state.

Additionally, aspects of the operations described above may be performed in parallel, and/or in sequential stages. For example, as a film series is being processed by processor 150, the processed film series may be stored on the storage device 140 before the processing on processor 150 is completed. Similarly, as a film is scanned in on film scanners 112 and 114, the images may undergo film registration and cleanup on processor 140 in scanned data sets (e.g., groups of images received on a single scanning pass) before being stored.

Figure 4:
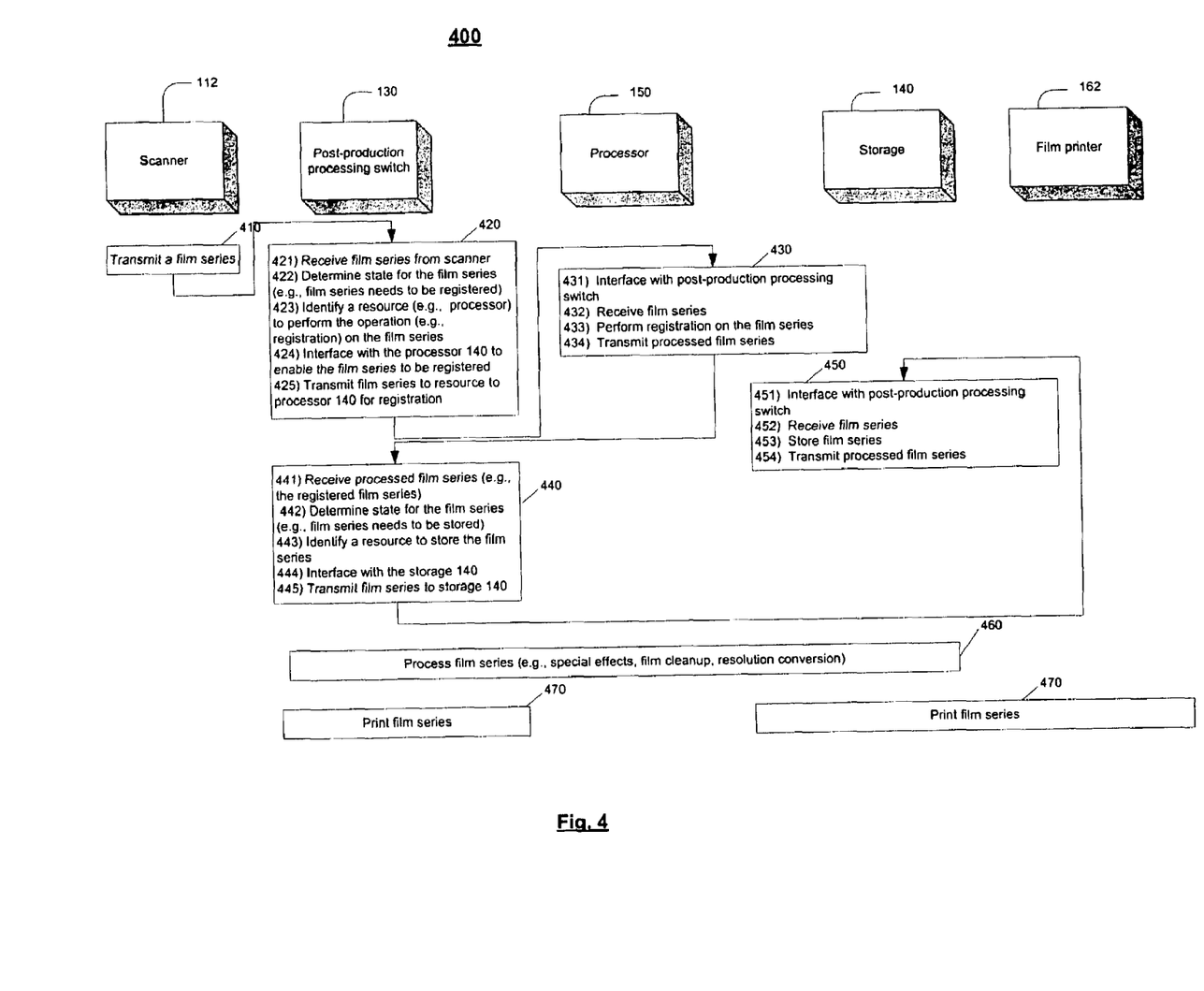
FIG. 4 is a diagram of a flow chart illustrating a process performed by the pose-production processing switch on the film series.

Referring to FIG. 4, a flow chart shows a process 400 performed by a film processing system configured to scan reels of film, process resulting film series, and write the film series to an output medium (e.g., film). Aspects of FIG. 4 relate to aspects of the system and operations described above. For example, the systems and operations described in FIG. 4 are generally described with respect to FIGS. 1-3. That is, the film scanner 112, the post-production processing switch 130, the storage 140, the processor 150, and the film printer 162 may relate to the film scanner 112, the post-production processing switch 130, the storage 140, the processor 150, and the film printer 162 illustrated in FIG. 1. Additionally, the post-production processing switch 130 also was described with respect to FIGS. 2 and 3. However, FIG. 4 illustrates an exemplary process from a point where the film is received on one or more reels to a point where the film series is written to a format for distribution.

Initially, the film scanner 112 transmits a film series to the post-production processing switch 130 (step 410). As part of the overall processing of the film series (step 420), the post-production processing switch 130 then receives the film series (step 421). The post-production processing switch 130 determines a state for the film series, for example, that the film series needs to be registered (step 422). Registration may include aligning the frames and the boundaries between frames in a scanning operation in which more than one frame may be scanned in a scanning operation. A resource is identified to perform the operation (step 423), which in this case includes identifying a processor to perform the registration. The post-production processing switch 130 interfaces with the processor 150 to enable the film series to be registered (step 424). The post-production processing switch then transmits the film series to the processor 150 for registration.

The processor 150 registers the images in the film series (step 430). As part of registering the film series, the processor 150 interfaces with the post-production processing switch (step 431). The processor 150 then receives the film series (step 432). Although interfacing with the post-production processing switch 150 and receiving the film series is shown as two operations, the two operations may be performed as part of the same operation. For example, the post-production processing switch 150 may transmit the film series with parameters in the film series descriptive of the processing that is required.

In any event, the processor 150 performs registration on the film series (step 433). The processor 150 then transmits the registered film series (step 434). Although the film series is shown as being processed through the post-production processing switch 130 to the processor 150 and then back to the post-production processing switch 130, one or more portions of the film series may be stored on the storage device 150. For example, the scanned film series may be stored before the image is registered.

As part of processing the registered film (step 440), the post-production processing switch receives the registered film series (step 441). The post-production processing switch 130 then determines a state for the film series, in this case, that the film series needs to be stored (step 442). The post-production processing switch 130 then identifies a resource (e.g., storage device 140) to store the film series (step 443), interfaces with the storage device 140 (step 444), and transmits the film series to the storage device 140 (step 445).

The storage device 140 stores the registered film series (step 450). As part of storing the film series, the storage device 140 interfaces with the post-production processing switch 130 (step 451), receives the film series (step 452), and stores the film series (step 453). If required by subsequent operations, the storage device 140 may transmit the processed film series (step 454) to other devices. For example, as is shown in FIG. 4, the storage device 140 may transmit the film series to the processor 150 for additional processing and/or to the film printer 162 for film printing.

The post-production processing switch 130, the processor 150 and the storage device 140 may process the film series (step 460), for example, by creating special effects, performing film and dust cleanup, and converting the resolution of the film series. Although processing the film series is described as occurring in one operation, generally, processing the film series typically includes the operations described in detail as part of receiving the film series from the film scanner (step 420), performing registration (step 430), and storing the registered film series (step 450). Similarly, the film printer 162 may print the film series (step 470).

Other implementations are within the scope of the following claims. For example, a management device may perform one or more of the functions described with respect to the post-production processing switch. The management device may include a program running on a separate device that is part of a host (e.g., a server), and also may include a component (e.g., a processing blade) in the post-production processing switch.

The post-production processing switch may include specialized hardware modules or blades in the switch configured to perform one or more post-production processing operations. For example, the post-production processing switch may include a blade that is configured to perform compression and decompression. Other examples of operations that may be implemented in hardware include the operations that have been described previously (e.g., color correction, resolution conversion, grain and dirt cleanup, special effects). The hardware may include reconfigurable logic, such as, for example, FPGAs and/or ASICs configured to download and implement operations in hardware.

In another example, the switch may include a blade with multiple general-purpose processors configured to perform post-production processing operations. The processors may receive instructions and selectively load code segments that perform the post-production processing operations indicated in the instructions. For example, a blade may include several processors. A blade management module may receive a message indicating that a specified range of the film series requires color correction. The blade may load color correction software to the processors and instruct each of the processors to perform color correction on a fraction of the range of the film series requiring color correction. The blade management and/or the processor may selectively retrieve portions of the film series, perform the color correction, and store the data representing the color corrected film series.

The operations were described with respect to how a film studio may produce a motion picture for distribution. However, the operations described also may be used in medical imaging and satellite operations. For example, a medical imaging scanner (e.g., a MRI ("Magnetic Resonance Imaging") or a CAT ("Computer Axial Tomography") device) may be used to generate images. These images may be used as a film series, and processed by a post-production processing switch. Although different operations may be performed on the film series, the architecture and techniques described previously may be used. Similarly, in satellite operations, the content being exchanged across satellite links may be processed as a film series, even though a film studio may not produce the content.

Additionally, although certain operations were described with respect to certain systems, other devices may perform these operations. For example, although identifying a resource is described as being performed on a post-production processing switch 130, those operations also may be performed on a management device. Similarly, proxy devices and intermediary devices may be used to perform one or more operations. For example, a load-balancing switch may be used as an intermediary device between the post-production processing device 130 and the processor 150 to determine the state of the resource.

The post-production processing switch 130 may aggregate multiple connections through a single network interface. For example, although the post-production processing switch 130 is shown in FIG. 1 at the center of a film processing system, the post-production processing switch may act as a "one-armed router" where a limited number of switch interfaces support a greater number of devices. That is, a film series may be received on a single interface. The film series may be processed and transmitted to a resource using the same interface that received the film series. Multiple switches and/or intermediary systems may be used.

What is claimed is:

1. A method of performing post-production processing in a sequence of discrete stages, the method comprising:

receiving at an intermediary system a film series of one or more data units comprising content related to a motion picture, wherein at least one of the data units in the film series includes a packet header;

extracting a parameter from the packet header;

determining, using the intermediary system, a post-production state for the film series based on the extracted parameter, wherein the post-production state is a discrete stage of post-production processing;

determining, using the intermediary system, an operation to be performed on the film series based on the post-production state of the flint series;
identifying, using the intermediary system, a resource that is appropriate to perform the operation to process the film series; and
interfacing, using the intermediary system, with the resource to enable the operation to be performed by the resource on the film series.

2. The method of claim 1 further comprising communicating the film series to the resource.

3. The method of claim 1 wherein identifying the resource includes determining an amount of processing that is required by a resource in performing the operation.

4. The method of claim 1 wherein identifying the resource includes determining an amount of storage that is required by a resource in performing the operation.

5. The method of claim 1 further comprising determining a priority for the operation relative to other operations being performed by the resource.

6. The method of claim 1 further comprising determining that the operation to be performed on the film series takes priority over an operation already designated for processing by the resource with respect to another film series.

7. The method of claim 1 wherein interfacing with the resource includes configuring the resource to perform the operation on the film series.

8. The method of claim 1 wherein the film series is received from a film scanner.

9. The method of claim 1 wherein the film series is received from a digital camera.

10. The method of claim 1 wherein interfacing with the resource includes controlling a scalable pool of processors to control a time required for processing by specifying a number of processors to perform the operation.

11. The method of claim 1 wherein the operation includes format conversion to convert the film series to a second format from a first format.

12. The method of claim 1 wherein the operation includes format correction to correct for errors introduced as the film series is converted to a second format from a first format.

13. The method of claim 1 wherein the operation includes special effects.

14. The method of claim 1 wherein the operation includes color correction.

15. The method of claim 1 wherein the operation includes film and dirt cleanup.

16. The method of claim 1 wherein the operation includes image data compression operations.

17. The method of claim 1 wherein the resource includes a film printer.

18. The method of claim 1 wherein the interfacing includes converting data from a first protocol to a second protocol.

19. The method of claim 1 wherein receiving a film series includes controlling a scanning process performed by a scanning array of one or more film scanners, the scanning process converting an image to a film series representing the image.

20. The method of claim 1 wherein the intermediary system includes a switch.

21. The method of claim 20 wherein the switch aggregates support for multiple resources through a single network interface.

22. The method of claim 1 wherein the intermediary system includes multiple intermediary systems.

23. A post-production processing switch comprising:
a first communications interface structured and arranged to receive a film series of one or more data units comprising content related to a motion picture, wherein at least one of the data units in the film series includes a packet header;
a header processor structured and arranged to extract a parameter from the packet header;
a state processor structured and arranged to determine a post-production state for the film series based on the extracted parameter, wherein the post-production state is a discrete stage of post-production processing;
an operation processor structured and arranged to determine an operation to be performed on the film series based on the post-production slate of the film series;
a resource manager structured and arranged to identify a resource appropriate to perform the operation on the film series; and
a second communications interface structured and arranged to interface with the resource to enable the operation to be performed by the resource on the film series.

24. The post-production processing switch of claim 23 wherein the second communications interface is structured and arranged to communicate the film series to the resource.

25. The post-production processing switch of claim 23 wherein the resource manager is structured and arranged to determine an amount of processing that is required by a resource performing the operation.

26. The post-production processing switch of claim 23 wherein the resource manager is structured and arranged to determine an amount of storage that is required by a resource performing the operation.

27. The post-production processing switch of claim 23 further comprising a priority processor structured and arranged to determine a priority for the operation relative to the other operations being performed by the resource.

28. The post-production processing switch of claim 27 wherein the priority processor is structured and managed to determine that the operation to be performed on the film series takes priority over an operation already designated for processing by the resource With respect to another film series.

29. The post-production processing switch of claim 23 wherein the second communications interface is structured and arranged to configure the resource to perform the operation on the film series.

30. The post-production processing switch of claim 23 wherein the first communications interface receives the film series from a film scanner.

31. The post-production processing switch of claim 23 wherein the first communications interface is structured and arranged to receive the film series from a digital camera.

32. The post-production processing switch of claim 23 wherein the resource includes a storage device.

33. The post-production processing switch of claim 32 wherein the storage device comprises categories for two or more different versions of the film series in different stages of processing.

34. The post-production processing switch of claim 32 wherein the different stages of processing include a partially processed version of the film series.

35. The post-production processing switch of claim 23 wherein the resource includes one or more processors.

36. The post-production processing switch of claim 35 wherein the processors comprise reconfigurable processors enabled to change a type of post-production processing performed.

37. The post-production processing switch of claim 35 wherein the processors includes a scalable pool of processors enabling a processor controller to control a time required for processing by enabling the processor controller to specify a number of processors to perform the processing.

38. The post-production processing switch of claim 35 wherein the operation performed on the processors includes format conversion to convert the film series to a second format from a first format.

39. The post-production processing switch of claim 35 wherein the operation performed on the processors includes format correction to correct for errors introduced as the film series is converted to a second format from a first format.

40. The post-production processing switch of claim 35 wherein the operation performed on the processors includes special effects.

41. The post-production processing switch of claim 35 wherein the operation performed on the processors includes color correction.

42. The post-production processing switch of claim 35 wherein the operation performed on the processors includes grain and dirt cleanup.

43. The post-production processing switch of claim 35 wherein the operation performed on the processors includes image data compression operations.

44. The post-production processing switch of claim 23 wherein the resource includes a film printer.

45. The post-production processing switch of claim 23 further comprising a protocol processor structured and arranged to convert data units from a first protocol to a second protocol.

46. The post-production processing switch of claim 23 wherein the state processor is structured and arranged to read a parameter in the film series to determine the post-production state for the film series.

47. The post production processing switch of claim 23 wherein the first communications interface is structured and arranged to control a scanning process performed by a scanning array of one or more film scanners, the scanning process converting an image to a film series representing the image.

48. A post-production processing switch comprising:
means for receiving a film series of one or more data units, the data units comprising a piece of content related to a motion picture, wherein at least one of the data units in the film series includes a packet header;
means for extracting a parameter from the packet header;
means for determining a post-production state for the film series based on the extracted parameter, wherein the post-production state is a discrete stage of post-production processing;
means for determining an operation to be performed on the film series based on the post-production state of the film series;
means for identifying a resource that is appropriate for processing the film series; and
means for interfacing with the resource to enable the operation to be performed by the resource on the film series.

49. The method of claim 1 wherein the discrete stage of post-production processing identified by the post-production state is a non-initial stage of post-production processing.

50. The post-production processing switch of claim 23 wherein the discrete stage of post-production processing identified by the post-production state is a non-initial stage of post-production processing.

51. The post-production processing switch of claim 48 wherein the discrete stage of post-production processing identified by the post-production state is a non-initial stage of post-production processing.

52. The method of claim 1, wherein the packet header is a network layer header.

53. The method of claim 52, wherein the network layer header is an Internet Protocol header.

54. The method of claim 1, wherein the extracted parameter includes IP address information.

55. The method of claim 1, wherein the extracted parameter includes frame registration information.

56. The method of claim 1, wherein the extracted parameter comprises information about the data unit that includes at least one of resolution, encoding, priority, or processing information.

57. The method of claim 1, wherein the intermediate system maintains state of resources that are capable of performing operations to process the film series.

* * * * *

UNITED STATES PATENT AND TRADEMARK OFFICE
CERTIFICATE OF CORRECTION

| | | |
|---|---|---|
| PATENT NO. | : 7,376,183 B2 | |
| APPLICATION NO. | : 10/284461 | |
| DATED | : May 20, 2008 | |
| INVENTOR(S) | : Gilbert G. Weigand, Paul R. Klamer and Christopher J. Cookson | |

It is certified that error appears in the above-identified patent and that said Letters Patent is hereby corrected as shown below:

Column 15, line 3, please delete "flint" and insert --film-- therefore.

Column 16, line 15, please delete "slate" and insert --state-- therefore.

Column 16, line 44, please delete "With" and insert --with-- therefore.

Column 17, line 41, please delete "post production" and insert --post-production-- therefore.

Signed and Sealed this

Fifth Day of August, 2008

JON W. DUDAS
*Director of the United States Patent and Trademark Office*

UNITED STATES PATENT AND TRADEMARK OFFICE
CERTIFICATE OF CORRECTION

PATENT NO. : 7,376,183 B2
APPLICATION NO. : 10/284461
DATED : May 20, 2008
INVENTOR(S) : Gilbert G. Weigand It is certified that error appears in the above-identified patent and that said Letters Patent is hereby corrected as shown below:

Title Page Item (73) Assignee: after "Warner Bros. Entertainment, Inc., Burbank, CA (US)" please add --Time Warner, Inc., New York, NY (US)-- and --AOL LLC, Dulles, VA (US)--.

Signed and Sealed this

Eighth Day of December, 2009

David J. Kappos
*Director of the United States Patent and Trademark Office*